United States Patent Office 3,605,789
Patented Sept. 20, 1971

3,605,789
VALVE FLUSHING SYSTEM
Donald E. Graham, San Leandro, Calif., assignor to Grove Valve and Regulator Company, Oakland, Calif.
Filed May 4, 1970, Ser. No. 34,417
Int. Cl. F16k 5/08
U.S. Cl. 137—240
10 Claims

ABSTRACT OF THE DISCLOSURE

A valve flushing system including a pair of flush lines connected to the top and bottom, respectively of a ball valve body. A discharge line is connected between one of the lines and the main upstream line, and a reversing line is connected between the other line and the discharge line. A valve is situated in each of the reversing and discharge lines so that fluid under pressure higher than that in the main upstream line may be forced through one of the lines, through the ball valve and out the other line to the discharge line. If the flushing is done when the valve is closed, the seat rings seal against the ball irrespectively of the direction of pressure differential so that the flushing fluid is confined between them.

BACKGROUND OF THE INVENTION

This invention relates to a valve flushing system and, more particularly, to a system for flushing out the interior of a rotatable plug valve body to prevent build up of deposits.

Some difficulties have been encountered in attempting to transport materials, such as coal, lime or mud through a conduit in the form of a slurry, in that the material is readily deposited in the line and valve cavities. An accumulation of such deposits on movable valve components, as for example the trunnions and bearings of a rotatable plug or ball valve tend to bind the valve and make operation difficult. Moreover, vents or ports in the valve tend to become clogged.

OBJECTS OF THE INVENTION

It is, therefore, an object of this invention to provide a system to prevent accumulation of slurry deposits around the trunnion and bearings of a quarter turn valve.

It is a further object of this invention to provide a system for flushing out restricted passages in a valve body.

It is a further object of this invention to provide a flushing system for removing deposits entrapped in the body cavity of a valve.

It is a further object of this invention to provide a flushing system for cleaning trunnions and bearings of a quarter turn valve.

It is a further object of this invention to provide a system for flushing the body cavity of a valve in a slurry pipe line with a material not incompatible with the slurry and without introducing a fluid downstream of the valve.

It is a further object of this invention to provide a system for flushing a valve body with a liquid which is confined to the body space and upstream passage.

Other objects and advantages of this invention will become apparent from a detailed description to follow when read in conjunction with the accompanying drawings.

BRIEF SUMMARY OF THE INVENTION

In carrying out this invention, there is provided, particularly on a plug or ball valve in a slurry-carrying conduit or pipe line, a piping system for flushing out the valve by forcing fluid, which is in the same as the slurry carrier, e.g. water, through the valve body cavity and then to the upstream line. The pressure of the fluid is high enough to discharge into the upstream line, but not so high that there will be an erosion-producing high pressure drop across valve components. In one embodiment, one line is connected to the top of the valve body and another line is connected to the bottom. The latter is connected to a discharge line that opens into the upstream side of the main valve and a reversing line connects the former to the discharge line. Valves are arranged in the discharge and reversing lines so that the valve body cavity may be flushed from top to bottom and out the discharge line or from bottom to top and out the discharge by way of the reversing line. The main valve seals are adapted to seal both upstream and downstream, irrespective of the direction of pressure differential, so that if the valve is closed, the flushing liquid will be contained within the piping and the valve body cavity until dumped into the upstream line.

DESCRIPTION OF A PREFERRED EMBODIMENT

Figure 1:
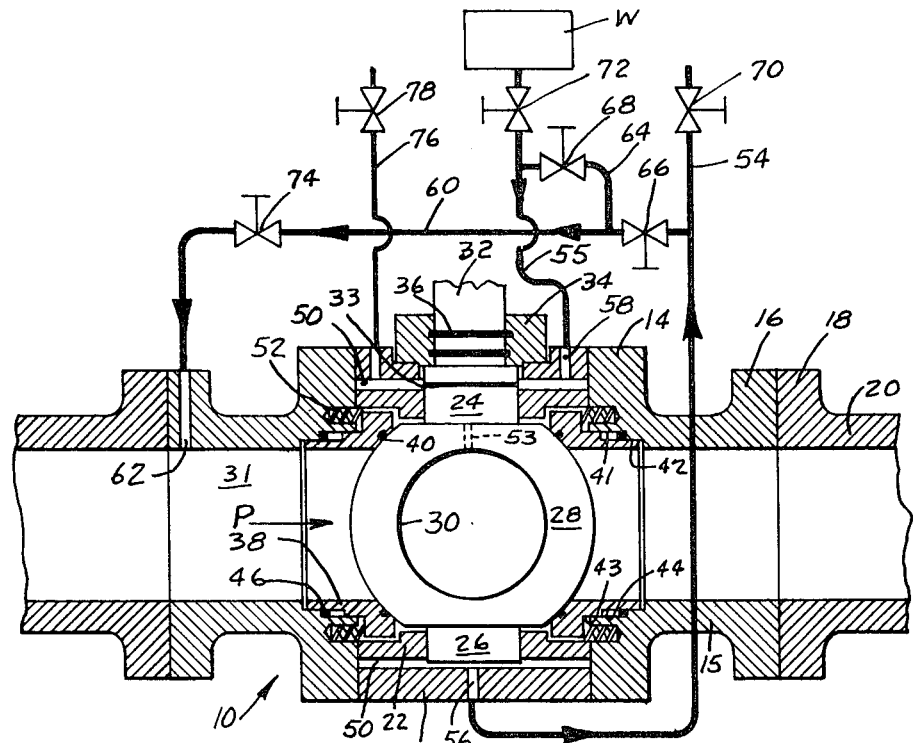
FIGS. 1 and 2 are schematic diagrams of the valve flushing system of the invention.

Referring now more particularly to the drawing there is shown a plug or ball valve 10 with a cylindrical body band 12 and end closures 14 with integral hubs 15 terminating in flanges 16. The flanges 16 are shown merely for purposes of illustration and any suitable hub end may be provided for connection to a complementary end 18 of a conduit or pipe line 20. Bearing blocks 22 are clamped between the end closures 14 and rotatably receive top and bottom trunnions 24 and 26 integral with the ball closure 28. A flow passage 30 through the ball is adapted to be aligned with complementary flow passages 31 when the ball is in its open position, rotated through 90° from its closed position shown in the drawing. A stem 32 rotatably carried in a top plate 34 secured to the body band 12 may be turned to open and close the valve by engagement of pins 33 with the top ball trunnion 24. Suitable seals, such as O-rings 36 seal around the stem.

Mounted in the body around the flow passages 31 and on opposite sides of the ball 28 are seat rings 38 with a main seal ring 40 in the leading face of each. A first bore 41 slightly larger than the sealing diameter of the main seal 40 and a counterbore 42 somewhat smaller than the main seal diameter, form intermediate and trailing internal cylindrical surfaces which slidably receive complementary external intermediate and trailing cylindrical surfaces 43 and 44 on the seat rings 38. A resilient O-ring 46 seals between the concentric cylindrical surfaces 41 and 44 to provide a piston effect to be described, isolating the body space 50 from the flow passages 31. A plurality of coil springs 52 urge the seat rings 38 toward the ball to initiate sealing. A pressure equalizing passage 53 may be provided to equalize body pressure and line pressure when the valve is open.

The structure that produces the "piston effect" previously referred to is described in detail in U.S. Pat. No. 2,796,230 granted June 11, 1957 to Marvin H. Grove and Austin U. Bryant for "Valve Construction." Briefly, however, the opposed cylindrical surfaces 41 and 44 of the bore and trailing portion of the seat ring 38 are, respectively, larger and smaller than the sealing diameter of the main seal ring 40 so that there is a larger area behind the seat ring than in front of it exposed to biasing pressure pushing it toward the ball 28 irrespective of the direction of pressure. For example, considering the seat ring on the right in FIGS. 1 and 2 assume that the pressure in the body space 50 is higher than that in the flow passage 31. Then the tail O-ring 46 will be pushed to the right and the higher body space pressure will act on the back of the seat ring radially inward to the circumference of the external trailing surface 44. On the front of the seat ring it can act inward only to the sealing diameter of the main seal. Hence, there is an area differential exposed to body pressure producing a net force that drives the seat ring to the left against the ball 28.

If on the other hand the line pressure is the higher of the two, the O-ring 46 will be forced to the left and the line pressure will act on the back of the seat ring out to the diameter of surface 41 against which the O-ring seals. On the front of the seat ring body pressure can act only out to the main seal diameter. Hence, again there is a net force driving the seat ring 38 to the left against the ball. Because, the seat rings are forced against the ball irrespective of the direction of pressure differential there are both upstream and downstream seals isolating the body space 50 from the flow passages 31 under all pressure conditions. Under normal operating conditions with the valve opened the pressures in the body space 50 and in the line 31 will be equal and the springs 52 will bias both seat rings toward the ball 28. If, as hereinafter described, the body space is pressurized from an external source, to a level above the higher line pressure, both tail O-rings 46 will be forced toward the rear of the seat rings as shown in the drawings with the seat rings in sealing engagement.

In combination with the ball valve just described, there are provided first and second flushing lines 54 and 55 opening into ports 56 and 58 in the bottom and top, respectively, of the valve body band 12 in a zone intermediate the seat rings 38 so that any flushing fluid introduced will be isolated from the flow passages as previously described. Connected to the first flushing line 54 is a discharge line 60 which opens into a port 62 on the upstream side of the valve, the direction of pressure being indicated by the arrow P. A reversing line 64 is connected between the second flushing line 55 and the discharge line 60. Suitable valves 66 and 68 are provided in the discharge line intermediate the first flushing line and the reversing line, and in the reversing line respectively. Other valves 70, 72 and 74 may be provided in the first and second flush lines and in the discharge line. Also, if desired, a third flush line 76 with valve 18 may open through the valve body band 12.

MODE OF OPERATION

In operation, the valve 10 may be flushed, whether in its open position or the closed position shown by opening the valve 72 to a source of the liquid W, usually water, which serves as the carrier in the slurry and opening the valves 66 and 74 in the discharge line. This setting will provide the mode of circulation illustrated in FIG. 1 wherein the water is forced under pressure somewhat greater than the upstream pressure P into the body space 50 to free any deposits that may have accumulated around the trunnions 24 and 26 and in the pressure equalizing port 53. Then the flushing fluid flows out through the first flushing line 54 and through the discharge line 60 to the upstream line 31.

Figure 2:
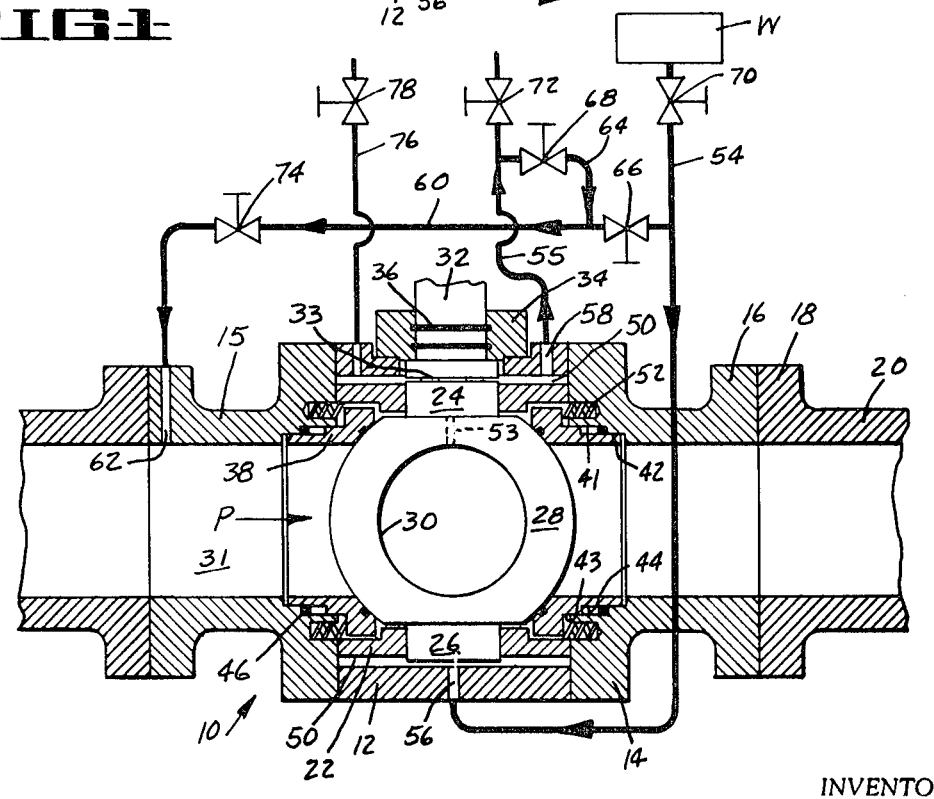

Alternatively, the system may be flushed as shown in FIG. 2 wherein the first flush line intake valve 70 is opened to the source of water W and the valves 66 and 72 are closed while the reversing valve 68 is opened. With this setting, the fluid is flushed through the line 54 to the bottom of the body space 50 and then around the ball 28 and out the port 58 and line 55. From line 55 the flushing fluid is diverted through reversing line 64 to the discharge line 60.

In either case, the slurry that is entrapped in the body space by flowing through the flow passage 30 in the ball 28 as it turns from open to closed position is diluted by the flushing stream and any deposits in the body space and in the equalizing port 53 are carried away into the upstream line. By directing the flushing fluid to the upstream line, the possibility of erosion in valve components, such as in the equalizing port, and in the flush lines, is reduced by minimizing the pressure drop across such components. Moreover, by flushing with the slurry carrier, there is no contamination. Except for a small amount of flow through the equalizing port, the flow of flushing fluid is restricted to the body space between the seat rings even when the valve is open, producing a more efficient flushing action.

While this invention has been described in conjunction with a preferred embodiment thereof, it is obvious that changes therein may be made by those skilled in the art without departing from the spirit and scope of this invention.

What is claimed as the invention is:

1. A flushing system for a main valve having a valve body adapted to be mounted in a slurry-transporting conduit comprising:
   first and second flush lines adapted to be connected to said main valve body at spaced points thereon,
   a discharge line adapted for connection between said first flush line and the upstream side of said main valve,
   a reversing line adapted for connection between said second flush line and said discharge line,
   first valve means in said discharge line intermediate said first flush line and said reversing line,
   second valve means in said reversing line,
   a source of fluid at a pressure slightly greater than that of the upstream side of said main valve, and
   means selectively connecting one of said first and second flush lines to said pressure fluid source.

2. The combination defined by claim 1 wherein:
   the fluid delivered from said source thereof is the carrier of said slurry.

3. The combination defined by claim 1 wherein:
   said first and second flush line are connected to the bottom and top respectively, of said main valve body.

4. The combination defined by claim 3 wherein:
   said main valve is a rotatable quarter turn valve with a top trunnion, and
   said second flush line is connected to the top of said main valve body adjacent said trunnion.

5. In a main valve adapted to be mounted in a slurry-transporting conduit having a valve body and a valve closure member:
   a pair of seat rings in said body on opposite sides of said closure member,
   a main seal ring on the leading face of each of said seat rings for sealing against said closure member,
   a trailing seal ring on a trailing portion of each of said seat rings for sealing against said body,
   the diameters of said main and trailing seal rings being selected so that there is a greater area on the trailing sides of said seat rings than on the leading side thereof exposed to the greater of two pressures imposed on said seal rings irrespective of the direction of pressure differential,
   a pair of flush lines connected to said main valve body at spaced points therein intermediate said seat rings,
   a discharge line adapted for connection between one of said flush lines and the upstream side of said main valve, and
   a source of fluid at a pressure greater than that of said upstream side adapted to be selectively connected to one of said flush lines.

6. The combination defined by claim 5 wherein:
   each of said seat rings has an intermediate cylindrical external surface of a diameter larger than the sealing diameter of said main seal ring and a trailing cylindrical external surface of a diameter smaller than said main sealing diameter,
   complementary intermediate and trailing internal cylindrical surfaces on said body slidably receiving said seat ring surfaces,
   portions of said intermediate internal surface and said trailing external surface being in opposed, spaced relationship, and said trailing seal ring comprising a resilient seal ring sealing between said opposed portions.

7. The combination defined by claim 5 including:
a reversing line adapted for connection between the other of said flush lines and said discharge line,
first valve means in said discharge line intermediate said one flush line and said reversing line,
second valve means in said reversing line, and
means selectively connecting one of said first and second flush lines to said pressure fluid source.

8. The combination defined by claim 5 wherein:
the fluid delivered from said source thereof is the carrier of said slurry.

9. The combination defined by claim 5 wherein:
said flush lines are connected to the bottom and top respectively of said main valve body.

10. The combination defined by claim 9 wherein:
said main valve is a rotatable quarter turn plug valve with a top trunnion.

References Cited
UNITED STATES PATENTS

| | | | |
|---|---|---|---|
| 312,158 | 2/1885 | Peeney | 137—239 |
| 934,614 | 9/1909 | Huxley | 137—238X |
| 2,128,124 | 8/1938 | Diebold | 137—240X |
| 2,796,230 | 6/1957 | Grove et al. | 251—172 |
| 2,920,635 | 1/1960 | Wilson | 137—240X |

M. CARY NELSON, Primary Examiner

R. GERARD, Assistant Examiner